(12) United States Patent  
Schnabl

(10) Patent No.: US 8,964,970 B1  
(45) Date of Patent: Feb. 24, 2015

(54) PHONE

(71) Applicant: Andre Schnabl, Miami, FL (US)

(72) Inventor: Andre Schnabl, Miami, FL (US)

( * ) Notice: Subject to any disclaimer, the term of this patent is extended or adjusted under 35 U.S.C. 154(b) by 0 days.

(21) Appl. No.: 14/096,308

(22) Filed: Dec. 4, 2013

(51) Int. Cl.
- *H04M 1/00* (2006.01)
- *H04M 9/00* (2006.01)
- *H04M 1/02* (2006.01)
- *H04M 1/11* (2006.01)

(52) U.S. Cl.
CPC ............. *H04M 1/0295* (2013.01); *H04M 1/11* (2013.01)
USPC ................... 379/428.03; 379/428.04

(58) Field of Classification Search
USPC ........................ 379/428.01–428.04, 436, 447; 455/575.1, 462
See application file for complete search history.

(56) References Cited

U.S. PATENT DOCUMENTS

| | | | |
|---|---|---|---|
| 5,600,709 A * | 2/1997 | Hoflinger | 455/462 |
| 2014/0285150 A1 * | 9/2014 | Toh | 320/115 |

\* cited by examiner

*Primary Examiner* — Tuan D Nguyen

(74) *Attorney, Agent, or Firm* — Christopher J Vandam, PA; Chris Vandam

(57) ABSTRACT

An internet protocol telephony device powered by a tablet computer affixed to a housing. The housing includes any of a speaker, a microphone and a camera that are operatively connected to the tablet computer. A handset is also operatively connected to the tablet to offer traditional feeling communication hardware. The tablet offers additional internet and intranet based functionality.

4 Claims, 2 Drawing Sheets

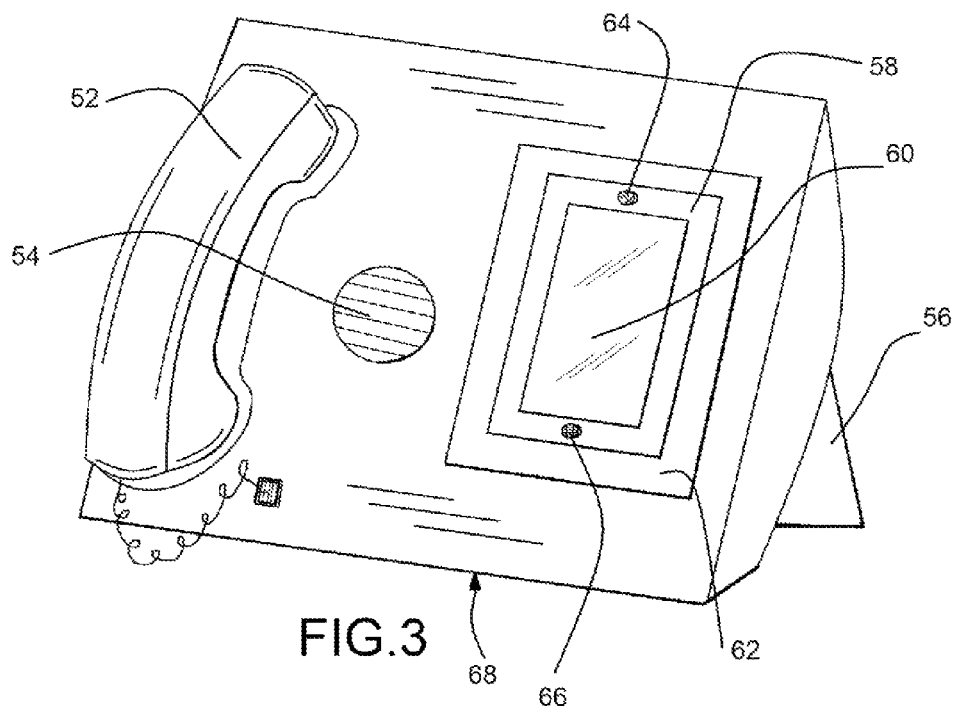
FIG.3
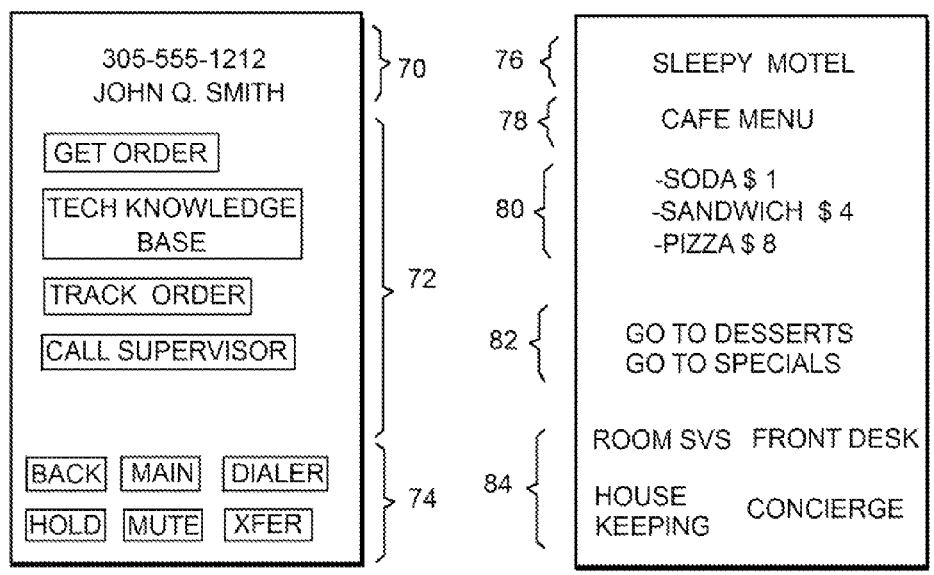
FIG.4
FIG.5

PHONE

BACKGROUND OF THE INVENTION

1. Field of the Invention

The present invention relates to telephony, and more particularly, to a phone with voice and video capabilities that is powered by a tablet computer fixed into a multi-function housing.

2. Description of the Related Art

Several designs for telephones have been designed in the past. None of them, however, includes an off the shelf tablet computer fixed to a housing that also includes a traditional handset.

Other prior art telephones include screens that can display information as well as video conferencing capabilities but none are powered by the processor in a standard tablet or other small handheld computer affixed in a housing with other features to complement the capabilities of the tablet including, for example, a full size conventional handset and/or external audio speakers and microphone.

Prior art telephones have also had various versions of software and capabilities that are not anticipated by the present device. The present device can be adaptable to many uses because the tablet computer powering the individual phones is very adaptable. A mere sample of the capability of the present invention is provided in this document and is intended to only be a sample to guide users and developers towards other available possibilities.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a highly adaptable communications device.

It is another object of this invention to provide a phone system that can be deployed and maintained on an enterprise scale with minimal cost and human involvement.

It is still another object of the present invention to provide a phone that produces an experience for the user of a traditional style phone melded with the capabilities and flexibility of a modern internet protocol phone system.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates an alternate version of the device with optional features.

FIG. 4 is a representation of a screen shot example.

FIG. 5 is another screen shot example of a what a user may experience on the device.

DETAILED DESCRIPTION OF THE PREFERRED EMBODIMENT

Figure 1:
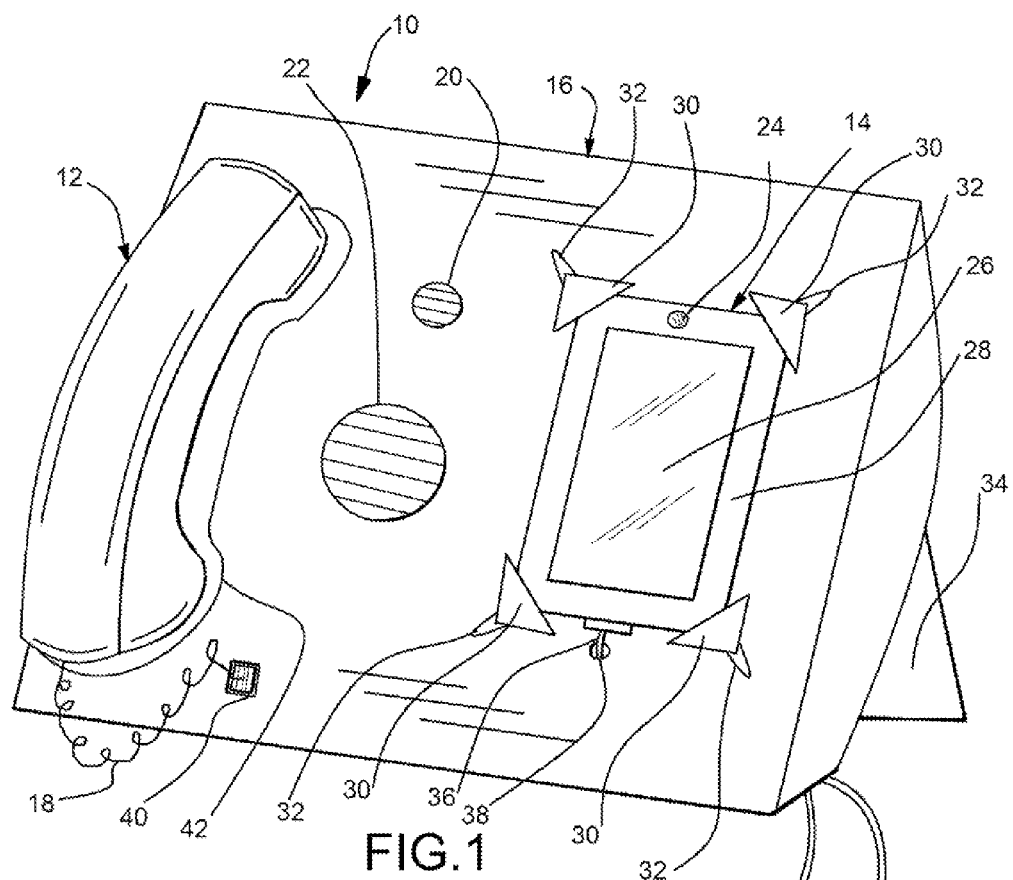
FIG. 1 represents a perspective view of a version of the device with optional features.

Referring now to the drawings, where the present invention is generally referred to with numeral 10, it can be observed that it basically includes a handset 12, a tablet 14, a housing 16, a cord 18, a microphone 20, a speaker 22, a camera 24, a screen 26, a bezel 28, clips 30, tracks 32, a stand 34, a plug 36, a port 38, a port 40, a cradle 42, cord 44 and a cord 46, among other elements.

A phone apparatus is provided that essentially includes a housing 16 that provides support for a handset 12 and a tablet 14 as well as the other features. The handset 12 is preferably a full-size traditional telephone-style handset that the user can hold to the side of their head. On an upper end is a speaker that is put near the user's ear and on the lower end is a microphone that the user can speak into during normal use as duplex audio device.

In at least some versions of the device it is preferred to have a cord 18 that connects the handset 12 to the tablet 14. This can be similar to a common phone cord. This can increase security by limited a point of electronic interception. It also provides the traditional look, feel and stability of a familiar form factor that has been used for many years on millions of phones.

The port 40, optional and if present, connects the cord 18 to the housing 16. Not seen in FIG. 1 and inside the housing 16, the cord 18 connected to the tablet 14, for example, at plug 36 to the tablet. There may be a wiring harness that connects and transmits signal and power to the speaker 22, microphone 20 and handset 12 from the tablet 14 or other power source.

The plug 36 could also be connected to a universal serial bus (USB) hub, possibly inside the housing 16, that connects the speaker 22, handset 12 and other elements described herein. This could also be integrated with the plug 44 to provide powered USB plugs to easily and effectively connect the system. Also, a 3.5 mm or other similar audio jack could be used to connect the tablet 16 to the handset and/or speaker and microphone if available on the tablet 16. Other connectors and cable technology may become available from time to time that falls within the scope of this disclosure and is intended to include such variations as within the spirit of the inventive concept.

In another version of the device the handset 12 is wirelessly connected to the housing 14. A limited range wireless means is also an effective design, for example Bluetooth. The cord 18 could still be present as a tethering device for security or simply as a means to supply power to recharge a wireless handset 12.

The tablet 14 is a self-contained computing device. It could equally be nearly any small hand-held computing device that has a touch screen, processor, battery, data storage, internet connectivity and accessory connection capability. This is not an exhaustive or list of absolutely required features but rather identified beneficial components for this version of the device. The term tablet is used because it is exemplary of the type of computing device that works well in the overall design of the present device.

Further, tablet computers are presently ubiquitous, capable and relatively economical. Although the specific parameters needed for a tablet to function fully is not precise, it is preferable, at least from an economic perspective, that the tablets are a couple of years out of date. This reduces the attractiveness to thieves or other bad actors. Also, depending on the features of the software used for the present application of the tablet, the capabilities of even an outdated tablet will be more than sufficient for acceptable performance.

The tablets could be unused new devices that are current or past models. It is also a beneficial application to re-use devices to keep waste from landfills and reduce the need to make additional parts for this invention.

The housing 16 is generally a structure into which a cradle 42 is formed to support the handset 12 while the handset 12 is not in use. The housing 16, in this version of the device, has a main microphone 20 to pick up voice sounds in a speakerphone mode. Even if the tablet 14 includes a microphone in its body, the microphone 20 built into the housing 16 can be better in that it is more suited to conference calls, maybe from a conference room table, in at least one version of the device a unidirectional microphone is the preferred embodiment of the microphone 20 as shown in FIG. 1.

A speaker 22 is also optionally present in the housing 16. The speaker 22 is used primarily for speaker phone applications with the tablet 14. It could also be used for other applications such as playing music or hearing videos played on the tablet 14.

The speaker 22 and microphone 20, if present in combination or individually in any design of the device are connected to the tablet 14 inside the housing 16. This could be to a universal serial bus (USB) port or other available connection means on the tablet 14. The connection could supply power as well as signal. In the adaption of the device shown on FIG. 1, a plug 36 connects to the tablet through a port 38 in the housing 16. Although not shown in the drawings. The speaker 22 and microphone 20 are connected via the plug 36 to the tablet 14. The connection with the plug 36 may be a proprietary connection made for a particular combination of tablet 14, speaker 22 and microphone 20.

One optional feature to attach the tablet 14 to the housing is by clipping the corners of the tablet 14 to the housing with clips 30. Each of the several clips 30 slide in track 32 at predetermined positions to adjust to different sizes and thicknesses of tablets 14. Although the example in FIG. 1 shows four clips 30 each in a track 32 there could be other reasonable configurations. For example, one or two adjacent clips 30 could be fixed (without complementary tracks 32) and the remaining corner clips 30 could be adjustable in the tracks 32 for securing the tablet 14 to the housing 16. Similarly, it could be effective to have only two clips 30, one for opposite corners of the tablet.

The clips 30, regardless of the configuration or style, have at least several purposes. The adjustability of the clips 30 allow a variety of different sizes of tablets 14 to be used in the device. The ability to lock and unlock the clips 30 allows for easy removal of the tablet 14 from the housing 16 for assembly, repair or replacement of the tablet 14. The locking means that lock the position of the clips 30 in place is preferably adapted to ad security to the device by making it more difficult for the tablet to be removed from the housing. Similarly, even if the clips 30 could be removed by the end user there may be include features, like a frangible seal, that would be tamper evident. The means to lock the clips 30 in place, like a screen head, could also be placed inside the housing 16 so that it would not be accessible to the typical user.

Stand 34 is provided affixed to the housing 16 to support the phone. It may be reconfigurable to best orient the phone on a horizontal surface, such as a desktop, or on a vertical surface, such as a wall. Mounting holes may be provided in the stand 34.

In some applications of the phone the tablet 14 may be wirelessly connected to the internet by standard wi-fi or other commonly available protocol. In some situations a hard wired internet connection is preferred and cord 46 is provided to make that connection. Cord 46 may be a commonly available Ethernet cable or other type of internet connection means.

Power cord 44 is supply the needed power to operate and charge the various components, particularly the tablet 14. The tablet 14 generally will have an internal power supply, such as a rechargeable battery. The whole phone and connected elements as described herein can also be powered by that battery, if present. For example, the phone could be moved to a position beyond the reach of the power cord 44 on the middle of a conference table for temporary use. Similarly, in the event of a power outage the phone could remain operational under battery power for a period of time.

Figure 2:
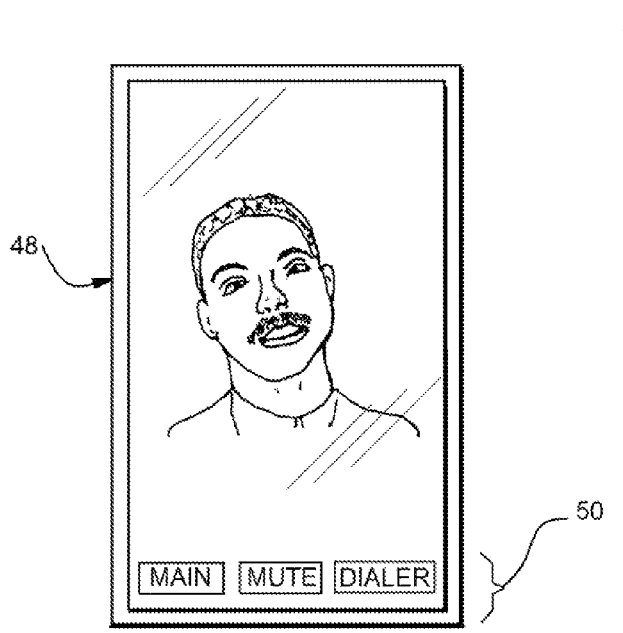
FIG. 2 shows a sample screen shot image.

FIG. 2 is a representative screen shot 48 that includes controls 50. In this example, a video conference is shown on the screen. Controls 50 are positioned in a convenient place on the screen. In a preferred variation of the device the screen is touch screen capable. In this sense the buttons are soft because they can be located at any place on the screen. The location and selection of which buttons appear may be selectable by the end user or may be set by the programmer establishing the operating environment of the system.

In this example of a screen shot 48 primary operating buttons are shown to include a selection for going to a main menu, to mute the conversation and a dialer. The dialer, in this example, could toggle the screen to a numeric keypad for entry of data. The other features of the phone or other software programs can be used simultaneously in a multi-functioning fashion.

FIG. 3 is another variation of a phone that includes, among other features, a handset 52, a speaker 54, a bracket 56, a bezel 58, a screen 60, a frame 62, a camera 64, a microphone 66 and a housing assembly 68.

The version of the device shown in FIG. 3 is similar to that shown in FIG. 1 but demonstrates some optional and alternate features. It should be understood that these features are interchangeable with other elements of the device to make a more functional design.

Yet referring to FIG. 3, the handset 52 is resting in the housing 68. A speaker 54 is provided to provide a higher performing audio experience than would be otherwise possible over a speaker integrated into the tablet itself.

Camera 64, analogous to the camera 24 in FIG. 1, is integral to the tablet and can provide both still images and video images for live video conferencing. Microphone 66, integral to the tablet, can provide an audio pickup when the device is used without the handset 52.

The tablet is secured to the housing 68 by means of a frame 62 that holds the tablet onto the housing 68 about the bezel 58 of the tablet while allowing the full surface area of the screen 60 to be exposed to the user for operational features. The bezel 58 provides security to keep the tablet attached to the housing 68. This can reduce the attractiveness to thieves who could be interested, in taking the tablet. A tamper evident seal could also be included to be able to determine whether an attempt to separate the tablet from the housing 68 has been made or other unauthorized attempts to alter the phone have been made.

The frame 62 can be rotated so that the tablet is oriented in either a portrait or landscape orientation. The orientation change can be detected by the tablet to automatically determine which edge of the screen is up so that it can be properly read. A software screen rotation can also be used to manually rotate the screen if an auto detect capability is not built into the tablet.

Wall bracket 56 is affixed to the housing 66 to provide a mounting means to attach the housing 66 to a wall or other vertically oriented surface.

FIG. 4 shows another example of a screen shot that includes information zones 70, 72 and 74. In this example more features possible with the device are demonstrated as mere examples. Many more possibilities of buttons, feature and orientations are possible.

In the example on FIG. 4, zone 70 shows a caller identification feature to remind the operator of to whom the call is connected. Other information to help the caller is also optionally available in zone 72 and could include soft buttons to navigate to additional information such as obtaining order information for a customer on the other end of the phone call or to access a knowledge database to help that customer with an issue that they may be having. A variety of other soft keys to perform basic phone functions such as hold, mute and transfer may also be available in any of a wide variety of configurations that is well within the scope of this invention.

FIG. 5 is yet another example of a screen shot that includes information zones 76, 78, 80, 82 and 84. This example may be suited to a hotel room phone where a guest is offered services. Zone 76 shows a title of the name of the hotel in case the guest needs that information handy. Zone 78 describes that the guest is presently reviewing the menu at the café. Zone 80 is list of menu items with the price. The guest can simply touch the item on the screen to place an order or get more information on that item. Zone 82 when touched changes the screen to provide the guest more relevant information, if desired. Zone 84 shows important functions that a motel may want to always be on the screen so that a guest can at any time touch the button, for example, for the front desk and then the phone will be immediately dialed for that extension.

Obviously, any of the screen shot examples are exactly that: examples. Any of a wide variety of information can be presented in a dynamic format, and with touch screen navigation and control. Any other communication or data access feature can equally be made available if the phone provide desires.

Another advantage of having the majority of controls for the device being soft controls is that for management or control of the system. Enterprise wide deployment of software fixes and changes can be made as easily as updating the software on an entire network of phones. This could be a great labor and time saver for example in a hotel with hundreds of phones, one in each room. Similarly, a company can have a phone on each employee's desk and can improve the design of the menu system or add and remove features on all phones in the system at the same time with minimal effort.

Other efficiencies can be built into the phone including allowing monitoring or recording of employee phone calls. Limiting of feature for specific phone at specific times, for example, no local calls during the work hours if the calls are expected to be customer service calls from out of the area. From time to time it is expected that other capabilities and services not specifically described herein will become desirable and available. This disclosure is intended to include any of the possible variations within the scope of the balance of the invention.

A version of the invention can be fairly described as 1. A phone comprised of, among other features, a housing, a tablet, a speaker and a handset. The housing provides a structure for attachment to and support for the components of the phone. It also contains the connection wires between the components to form a seamless looking design. The tablet includes a screen that has preferably has touchscreen capabilities to control with a finger movement, stylus pressure or similar commonly available touch screen means. The tablet is affixed to the housing with at least one clip selectively in either a portrait orientation or a landscape orientation. The tablet could be rotated or unclipped and re-affixed to the housing to change the orientation of the screen. As a security feature, the clip fastens the tablet to the housing so that the tablet cannot be separated from the housing during normal use. Of course the tablet should be removable for maintenance but the clips make removing it more troublesome. This would slow down the removal or make evident any tampering attempts to discourage molesting the integrity of the device. The handset includes an integral speaker and a microphone, to allow the user to hear and be heard with the handset. The handset is dimensioned to rest in a cradle on the housing to keep the phone in place and can also indicate to the system to answer or hang up the call. The handset is operatively connected to the tablet by a cable to ensure functionality and to have a familiar form factor. The speaker is affixed to the housing and operatively connected to the tablet to aid in the speaker phone mode performance. The tablet provides a computing capability to run a variety of commercially available applications or custom software designed to maximize the combination of the hardware for the stated use of the device. The computing capability includes at least internet connectivity, internet telephony, ability to operate interactive software and a video capture device but of course other features can be also made available. The computing capability is fully controlled by a soft button accessed on the screen so that no controls are needed on the housing. This allows flexibility in the type of tablet that can be used with the housing. The housing includes no other necessary controls other than what is available on the screen of the tablet which can also allow for easy, network wide reconfiguration of the screen and controlling buttons. The tablet, if it were to be disconnected from the other elements of the phone, would retain all of the computing capability. By this the tablet is generally an off the shelf, but obsolete for its highest intended purpose, tablet that is repurposed for use with this phone. In other words, no proprietary computing hardware is required for the system to function.

An option to the basic inventive concept is that said clip frames the screen and covers a bezel surrounding the screen on the tablet and the clip is attached the housing so that the tablet is affixed to the housing. This can be an attractive looking means to secure the phone to the housing. In this way the whole screen of the tablet remains visible for use and is securely held to the housing.

Another option is that housing includes a microphone that is operatively connected to the tablet. This microphone could be in addition to a microphone on the tablet itself and can be higher performing that that build into the tablet for speaker phone performance.

In a contemplated deployment of the device, a network of phones is created by linking each tablet to a computer network. This can be wirelessly peer to peer, by internet or intranet. In practice, an administrator can remotely control and alter the computing capability of each phone individually or multiple selected phones as a group. This can make maintenance and management of the system as a whole and individual phones far easier than is presently possible.

The foregoing description conveys the best understanding of the Objectives and advantages of the present invention. Different embodiments may be made of the inventive concept of this invention. It is to be understood that all matter disclosed herein is to be interpreted merely as illustrative, and not in a limiting sense.

What is claimed is:

1. A phone comprised of a housing, a tablet, a speaker and a handset;
   the housing providing a structure for attachment of components of the phone;
   the tablet includes a screen that has touchscreen capabilities;
   the tablet is affixed to the housing with at least one clip selectively in either a portrait orientation or a landscape orientation;
   the clip fastens the tablet to the housing so that the tablet cannot be separated from the housing during normal use;
   the handset includes an integral speaker and a microphone and is dimensioned to rest in a cradle on the housing;
   the handset is operatively connected to the tablet by a cable;
   the speaker is affixed to the housing and operatively connected to the tablet;
   the tablet provides a computing capability;
   the computing capability includes at least internet connectivity, internet telephony, ability to operate interactive software and a video capture device;
   the computing capability is fully controlled by a soft button accessed on the screen;
   the housing includes no controls other than what is available on the screen of the tablet;
   the tablet, if it were to be disconnected from the other elements of the phone, would retain all of the computing capability.

2. A phone as described in claim 1 further characterized in that said clip frames the screen and covers a bezel surrounding the screen on the tablet; and
   the clip is attached the housing so that the tablet is affixed to the housing.

3. A phone as described in claim 1 further characterized in that the housing includes a microphone that is operatively connected to the tablet.

4. A network of phones as described in claim 1 further characterized in that each tablet is connected to a computer network; and
   an administrator can remotely control and alter the computing capability of each phone individually or multiple selected phones as a group.

* * * * *